(12) United States Patent
Dullien et al.

(10) Patent No.: US 7,708,794 B2
(45) Date of Patent: May 4, 2010

(54) SEPARATOR MADE OF A FIBROUS POROUS MATERIAL SUCH AS A FELT

(75) Inventors: Francis A. L. Dullien, Drumbo (CA); Peter Karl Grinbergs, Dorchester (CA)

(73) Assignees: Institut Francais du Petrole, Rueil Malmaison Cedex (FR); Dullien Inc., Ontario (CA)

( * ) Notice: Subject to any disclaimer, the term of this patent is extended or adjusted under 35 U.S.C. 154(b) by 1121 days.

(21) Appl. No.: 10/466,252

(22) PCT Filed: Jan. 16, 2002

(86) PCT No.: PCT/FR02/00152

§ 371 (c)(1),
(2), (4) Date: Jan. 12, 2004

(87) PCT Pub. No.: WO02/057001

PCT Pub. Date: Jul. 25, 2002

(65) Prior Publication Data

US 2004/0103627 A1 Jun. 3, 2004

(30) Foreign Application Priority Data

Feb. 28, 2001 (FR) .................................. 01 02769

(51) Int. Cl.
*B01D 46/00* (2006.01)
(52) U.S. Cl. .............................. 55/484; 55/485; 55/523; 55/527

(58) Field of Classification Search .................. 55/293, 55/304, 342, 344, 350.1, 421, 440, 484, 523, 55/DIG. 13, DIG. 42, 385.3, 527, DIG. 28, 55/522, 444, DIG. 30; 95/141, 143, 286, 95/282; 422/180; 502/439, 527.19, 527.24; 264/44, DIG. 48; 210/510.1; 366/340; 123/198 E
See application file for complete search history.

(56) References Cited

U.S. PATENT DOCUMENTS 1,769,071 A * 7/1930 Raney ........................ 261/107

(Continued)

FOREIGN PATENT DOCUMENTS

FR 2 777 801 4/1998

OTHER PUBLICATIONS

Webster's Ninth New Collegiate Dictionary, Merriam-Webster, Inc., 1991, p. 1220.*

(Continued)

*Primary Examiner*—Duane Smith
*Assistant Examiner*—Minh-Chau T Pham
(74) *Attorney, Agent, or Firm*—Antonelli, Terry, Stout & Kraus, LLP.

(57) ABSTRACT

A separator is made of a porous material and is intended to treat gaseous effluents which contain particles whose size is substantially less than one micrometer or of the order of one micrometer. The porous material includes channels. The channels are delimited by a fibrous porous material such as batting.

22 Claims, 2 Drawing Sheets

U.S. PATENT DOCUMENTS

| | | | | |
|---|---|---|---|---|
| 2,829,735 | A * | 4/1958 | Kroll | 55/287 |
| 3,122,430 | A * | 2/1964 | Seidel et. al. | 96/131 |
| 3,190,057 | A * | 6/1965 | Sinex | 55/313 |
| 3,444,670 | A * | 5/1969 | Hungate | 96/356 |
| 3,616,623 | A * | 11/1971 | Reid | 55/440 |
| 3,873,281 | A * | 3/1975 | Himes et al. | 95/278 |
| 4,137,647 | A * | 2/1979 | Clark, Jr. | 34/82 |
| 4,386,947 | A * | 6/1983 | Mizuno et al. | 96/137 |
| 4,416,674 | A | 11/1983 | McMahon et al. | 55/485 |
| 4,437,867 | A * | 3/1984 | Lerner | 96/297 |
| 4,678,487 | A * | 7/1987 | Cadwell et al. | 55/385.1 |
| 4,894,074 | A * | 1/1990 | Mizrah et al. | 55/482 |
| 4,992,084 | A * | 2/1991 | Von Blucher et al. | 96/131 |
| 5,002,597 | A * | 3/1991 | Gielow et al. | 55/486 |
| 5,190,571 | A | 3/1993 | Fay et al. | 55/523 |
| 5,298,046 | A * | 3/1994 | Peisert | 55/486 |
| 5,308,457 | A * | 5/1994 | Dalla et al. | 95/143 |
| 5,750,026 | A * | 5/1998 | Gadkaree et al. | 210/502.1 |
| 6,007,593 | A | 12/1999 | Dullien | 55/323 |
| 6,080,225 | A * | 6/2000 | Forster | 95/57 |
| 6,238,464 | B1 * | 5/2001 | Dullien | 95/282 |
| 6,355,080 | B1 * | 3/2002 | Dullien | 55/523 |
| 6,375,014 | B1 * | 4/2002 | Garcera et al. | 210/490 |
| 6,383,422 | B1 * | 5/2002 | Hoffschmidt | 264/44 |
| 6,508,852 | B1 * | 1/2003 | Hickman et al. | 55/523 |
| 6,749,656 | B2 * | 6/2004 | Paumier et al. | 55/385.3 |
| 6,860,917 | B2 * | 3/2005 | Henrichsen et al. | 55/523 |
| 6,946,013 | B2 * | 9/2005 | Alward et al. | 55/523 |
| 7,033,412 | B2 * | 4/2006 | Kumar et al. | 55/523 |
| 7,078,004 | B2 * | 7/2006 | Voss et al. | 423/213.5 |
| 7,235,124 | B2 * | 6/2007 | Liu et al. | 96/154 |
| 2002/0162310 | A1 * | 11/2002 | Miller et al. | 55/523 |
| 2003/0101701 | A1 * | 6/2003 | Henrichsen et al. | 55/523 |

OTHER PUBLICATIONS

International Search Report w/English language translation, May 27, 2002.

International Search Report w/English language translation.

* cited by examiner

SEPARATOR MADE OF A FIBROUS POROUS MATERIAL SUCH AS A FELT

FIELD OF THE INVENTION

The present invention relates to the field of separators and more specifically to means intended to separate particles, in solid or liquid form, from a gaseous stream and whose size is less than or of the order of one micrometer.

BACKGROUND OF THE INVENTION

Many methods and devices have already been disclosed to that end.

U.S. Pat. No. 5,626,651 describes a method and a system of this type according to which the turbulent gaseous stream flows above a series of plates which define non-turbulent zones in which the particles are trapped. More precisely, the plates are parallel to one another and vertical. A filtering means consisting of fibers can also be provided between said plates in order to improve filtration of the finer particles notably.

International patent application WO-95/28,217 describes a device based on the same principle, but where the plates are provided with slots or replaced by grates.

Furthermore, patent application WO-97/00,102 relates to a separator arranged at the exhaust of Diesel type engines in order to collect the particles contained in the exhaust gas.

A honeycomb structure is therefore pierced with channels perpendicular to the opening of the honeycomb cells, this structure having a porosity of the order of 70%.

However, it has been observed that this type of separator cannot be used for fogs because the droplets trapped in the material cannot be removed by drainage.

International patent application WO-97/27,928 relates to a separator provided with one or more vertical flow channels laterally delimited by fibrous corrugated elements.

In this document, an agglomerator is necessarily arranged upstream from the separator in order to have larger particles likely to be separated in the separator. This is therefore relatively expensive and involves pressure drops that are by no means insignificant.

In U.S. Pat. No. 5,626,651, the trapped particles accumulate on the walls, then fall under the effect of gravity onto the bottom of the device. Means intended to shake the walls are often required to cause these particles accumulated on the walls to fall down.

This device poses problems when very fine particles, smaller than one micrometer, are to be separated. In this case, the height of the flow channel must be very small and therefore the height of the plates very large so that the equipment is quite bulky for a very small section of flow. The same problem exists in the device according to document WO-95/28,217.

However, these known means do not allow to collect and to remove efficiently particles in liquid or solid form whose size is less than about one micrometer.

Patent application WO-99/19,044 published in the name of the applicant describes a separator made of a foam comprising channels intended for the turbulent flow of the gaseous effluents, which allows to overcome the aforementioned drawbacks.

However, the applicant has continued research in the sphere of separation and has been able to develop a device which significantly improves the separation of very small particles present in gaseous effluents.

In a first research stage, it has been observed that, when a gaseous effluent in the turbulent state containing suspended particles flows through a channel 2 of diameter D made from a porous material (see FIG. 1), the boundary layer of this effluent enters, from the peripheral edge delimiting this channel, the inside of the porous material over a thickness L of a peripheral stratum 3 and, as a result of the eddy generated by this effluent, the particles are carried into this stratum 3 where they are collected by the fibers of the pores of the porous material.

Channel 2 therefore remains free of any hindrance, which allows the gaseous effluent to flow all along the channel with a constant pressure drop and flow rate since the accumulation of the particles collected lies in an annular space surrounding this channel.

According to the same principle and during another research stage, it has been discovered that, when a gaseous effluent in the turbulent state containing suspended particles flows along a face of a porous material in form of a sheet, the boundary layer of this effluent moves towards the inside of the porous material and, by means of the turbulent eddy generated by this effluent, the particles are carried into the superficial layer of this sheet where they are collected by the fibers of the pores of the porous material.

Similarly, in this configuration, the pressure drop of the effluent is minimal since the particles have accumulated in the body of the sheet without hindering the flow of this effluent.

SUMMARY OF THE INVENTION

The present invention thus relates to a separator made of a porous material, intended to treat under optimum conditions gaseous effluents containing liquid or solid particles whose size is substantially less than one micrometer or of the order of one micrometer.

According to the invention, a separator made of a porous material intended to treat gaseous effluents containing particles whose size is substantially less than one micrometer or of the order of one micrometer and comprising channels is characterised in that the channels are delimited by a fibrous porous material such as batting.

The porosity of said material can range between 90% and 99%.

The size of the pores forming said material can range between about 0.1 mm and about 5 mm.

The diameter of the fibers forming said material can range between 2 µm and 100 µm.

The diameter of the channels running through said material can range between 3 and 15 mm.

The length of the channels can range between about 10 cm and about 200 cm.

The effluents can flow in the turbulent state from one end of the channels to the other.

The material of the fibers can be a synthetic material.

The material of the fibers can be a ceramic material.

The porous material can have the shape of a sheet comprising channels.

The thickness of the sheet can range from 1 to 10 mm.

The porous material can be obtained by piling sheets.

The sheet can be supported by a plate made from an impermeable material having the same surface area as the sheets and provided with holes corresponding to the channels of the sheets.

The sheets are arranged at a distance from one another by bracing means.

The invention also relates to a separator made of a porous material intended to treat gaseous effluents containing particles whose size is substantially less than one micrometer or of the order of one micrometer and comprising channels, characterised in that it comprises at least one module consisting of at least one sheet made of a porous material, comprising channels and arranged substantially parallel to and at a distance from at least one other sheet and in that it comprises at least one plate made from an impermeable material having the same surface area as said sheet and provided with holes corresponding to the channels of the sheets.

The porosity of said material can range between 90% and 99%, the size of the pores ranges between about 0.1 mm and about 5 mm, and the diameter of the channels ranges between 3 and 15 mm.

The effluents can flow in the turbulent state over at least one face of the sheet.

The module can comprise at least two subassemblies of at least two sheets arranged at a distance from one another.

The sheets can be arranged at a distance from one another by bracing means.

The bracing means can consist of a frame preferably obtained from the plate.

The porous material can be charged with static electricity.

BRIEF DESCRIPTION OF THE DRAWINGS

Other features, advantages and improvements according to the invention will be clear from reading the description hereafter, given by way of non limitative example, with reference to the accompanying drawings wherein.

DETAILED DESCRIPTION

Figure 2:
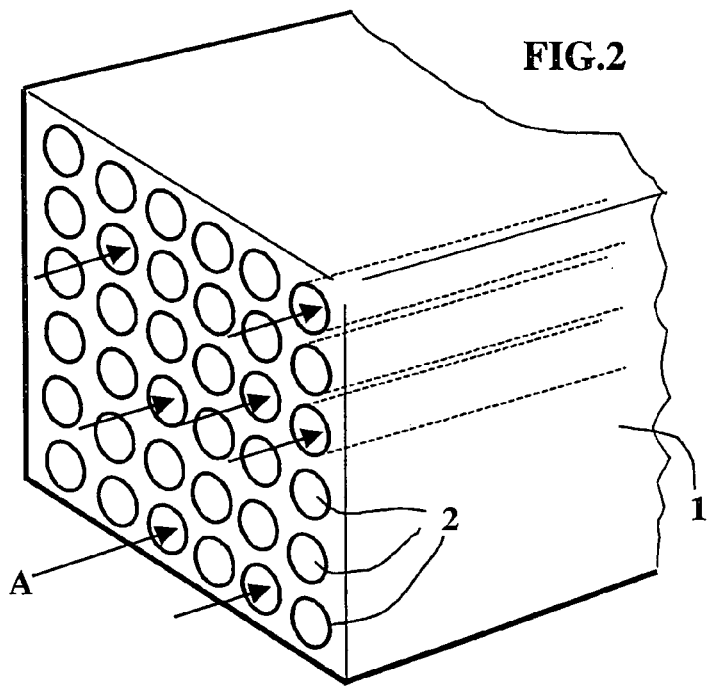
FIG. 2 is a perspective view of part of a separator according to the invention.

FIG. 2 shows a body 1 of a separator consisting, according to the invention, of a fibrous porous material such as batting.

Of course, batting is understood to be a porous material consisting of fibers or threads intimately entangled without weaving or spinning.

The material used for the fibers can advantageously be a synthetic material such as polyester or polypropylene, or a ceramic material.

The porous materials used in the invention consist of small pores, their porosity ranging between 90 and 99%.

The size of the pores ranges between about 0.1 mm and about 5 mm, and the diameter of the fibers ranges between 2 $\mu m$ and 100 $\mu m$, but a filament diameter ranging between 2 and 20 $\mu m$ may sometimes be preferred.

Furthermore, as can be seen in this figure, channels 2, preferably parallel to one another, are pierced or drilled in the body made of fibrous porous material or batting 1 and allow a fluid to flow therethrough as shown by arrows A in FIG. 2.

The diameter of channels 2 ranges here between 3 and 15 mm, and the distance between two channels can range between about 3 mm and up to about 20 mm.

The cross section occupied by flow channels 2 is between 15 and 50% of the total cross section of said body.

The section of the channels is preferably circular, as illustrated in FIG. 2, but the sections of the channels may have another shape without departing from the scope of the invention.

The general layout of the channels can be such that a gridded network of parallel channels is formed, but a network of channels with a different layout can be considered without departing from the scope of the invention.

By way of example, a test has been carried out to separate liquid particles, here droplets contained in an oil fog, by passage through a body made of polyester batting consisting of about 15-$\mu m$ diameter fibers and having a 97% porosity, which allowed to obtain a 99.5% particle recovery ratio.

Another test has been carried out in order to separate droplets contained in the same oil fog with a body made of ceramic batting comprising about 2-$\mu m$ diameter fibers and having a 93% porosity, which allowed to obtain a 99.8% recovery ratio for said droplets.

The tests carried out have allowed to show that the thickness L of stratum 3 (see FIG. 1) of the peripheral edge of channel 2 is directly proportional to the diameter (Df) of the fibers and to the diameter (D) of channel 2, that the value of ratio $L/Df \times D$ is substantially equal to a constant and that the value of L substantially ranges between 5 and 10 times the diameter of the pores.

In the field of separation of droplets forming a fog, the present invention has the advantage of draining the droplets which thus form a liquid that flows through gravity through the batting body.

Figure 3:
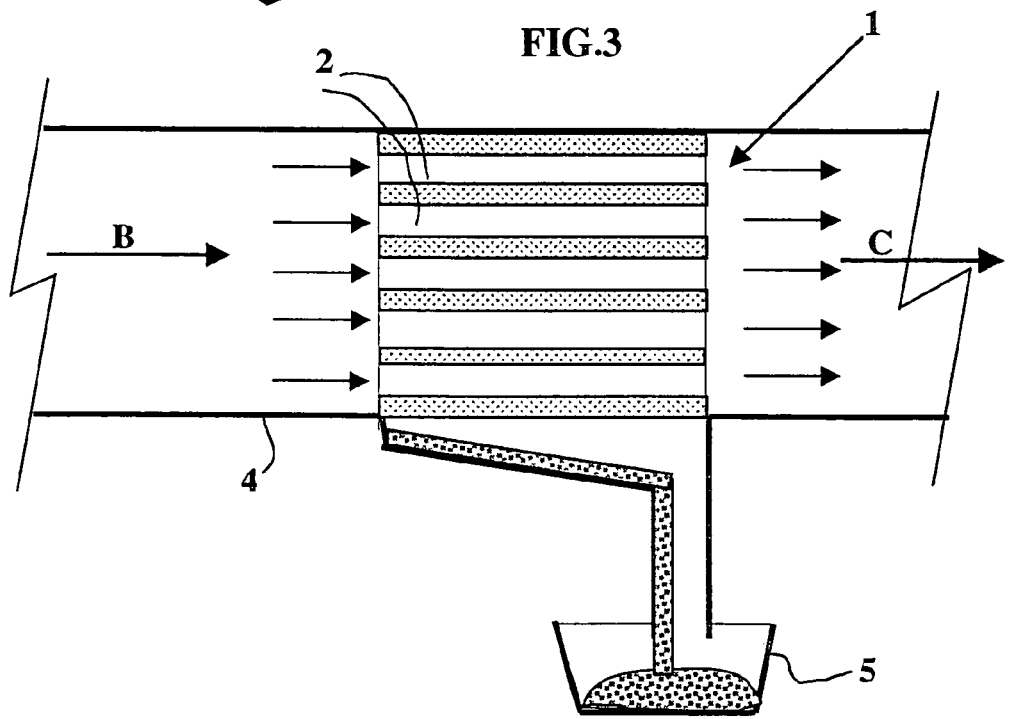
FIG. 3 is a diagrammatic longitudinal section of a device according to the invention.

An application example is illustrated by FIG. 3, which relates to a device provided with a viscous fog separator.

A mixture of gas and oily fog is fed, as shown by arrow B in FIG. 3, into an enclosure 4 which contains body 1 made of a porous batting material.

The mixture flows through channels 2 pierced substantially horizontal through body 1 and flows out of enclosure 4 as shown by arrow C at the other end of channels 2 after the oil droplets contained in this fog have settled in said channels. Drainage of the liquid formed after the droplets have settled, as obtained according to the invention, allows the oil to be collected at the bottom of enclosure 4. This oil can be discharged and stored in a tank or any specific means such as the means shown by reference number 5.

Thus, the oil collected by the threads or the fibers forming the batting flows to the bottom of the device substantially at the same flow rate as its absorption rate.

In relation to known separators, the present invention allows to do without a carcass or another holding element since the batting is originally rigid enough to be perforated by any means known in the art. Furthermore, a high precision can be obtained when making the channels.

The device according to the invention is also suited to the separation of gaseous effluent fumes because the deposits then appear on the threads or fibers of the batting where they form a solid or bituminous layer.

The particles being present in low concentrations, cleaning and/or replacement of the batting is rarely required.

Cleaning is performed, for example, during operations intended to vibrate or to shake the batting so that the particles contained therein can be discharged and then collected by any known means.

Furthermore, without departing from the scope of the invention, the batting according to the invention can be washed when it is dirty and put back in place once clean.

The separator according to the invention is also suited to the separation of industrial dust.

A test has been carried out in the case of separation of fumes from exhaust gas of a Diesel engine, with a batting body having 2-μm diameter ceramic fibers.

The section of this body is 8 cm by 10 cm, it is 25 cm in length and provided with 54 substantially circular 5-mm diameter channels.

During the test, the rate of flow of the exhaust gas was 100 m$^3$/h and the pressure drop was 8 kPa, and 80% of the soot present in this gas could be collected.

Another test has been carried out with dust contained in ambient air, for which the results were particularly satisfactory with a recovery ratio of the order of 82% for particles with a diameter below 0.5 μm.

This test was carried out using a separator consisting of a batting body made of 20-μm diameter polypropylene fibers charged with static electricity.

This separator had a section of 11 cm by 25 cm and a length of 23 cm, and it was provided with 181 5.5-mm diameter circular channels.

The rate of flow of the air through the separator was about 70 m$^3$/h, with a pressure drop of about 0.25 kPa.

Figure 4:
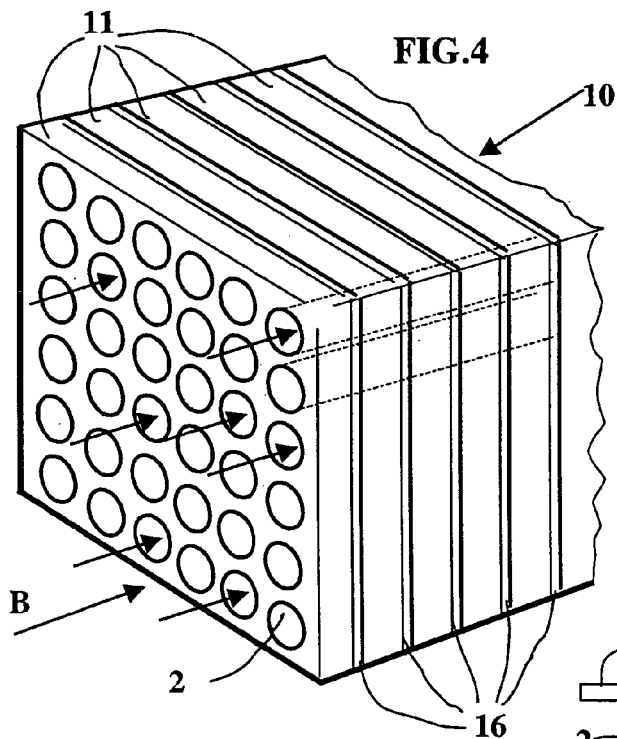
FIG. 4 is a perspective view of another embodiment of the invention.

In an embodiment of the invention as illustrated in FIG. 4, channels 2 are obtained by piling up sheets 11 made of a fibrous porous material such as synthetic material batting with a 97% porosity and fiber diameters of the order of 15 μm, said pile forming body 10 of the separator.

These parallelepipedic sheets, preferably identical, with a thickness of about 0.95 cm and a section of 11 cm by 25 cm, are each pierced with 123 holes or channels about 9.5 mm in diameter, then piled up 30 in number and arranged crosswise to the direction of a gaseous effluent in an about 30.5-cm long housing so as to form a multi-sheet block thus comprising, as a result of piling, 123 9.5-mm diameter channels.

The tests carried out with this multisheet block allowed to obtain a droplet recovery ratio of the order of 99.5% with a pressure drop of 2.5 kPa (10 in.w.c.) and a rate of flow of 250 m$^3$/h (150 CFM) of an oil fog containing droplets of a diameter below 1 μm.

Preferably, the batting sheets can be stiffened further by means of a specific treatment that will reinforce the cohesion of the fibers.

By way of example, this treatment consists in dipping the sheets, for example made of ceramic batting, in a n-decane silane solution, then in removing the excess solution on and in these sheets, in drying them with warm air and in subjecting the silane in an oven to a pyrolysis gradually up to 400° C.

Figure 5:
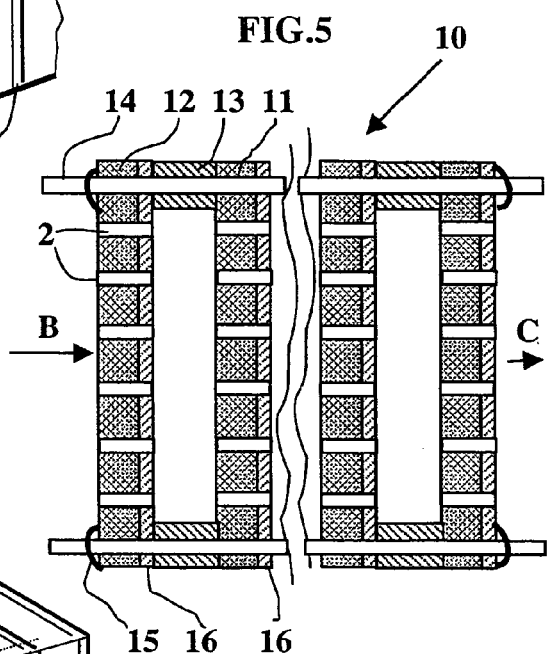
FIG. 5 is a view with local cross-sections showing a variant of the invention.

In a variant of the invention, the separator comprises a pile of at least one module consisting of at least one sheet 11 made of a porous material, which is held at a distance from at least one other sheet, as can be seen in FIG. 5, while being arranged substantially crosswise to the direction of the gaseous effluent from B to C.

In this case, the porous material used can be a foam, batting or cloth of high porosity ranging between 90% and 99%.

Then, after forming sheets with holes or channels, as described above, an orifice 12 is to be pierced in the vicinity of each corner of the sheets, then sheets held at a distance in relation to one another by braces 13, here tubular cylindrical braces arranged in agreement with orifices 12, are to be piled up.

Once this piling operation completed, a tie bar 14 is slid through orifices 12 and tubular braces 13 so as to run through the whole of the pile, then this assembly is held in position by locking means such as Belleville type lock spring washers 15 arranged at each free end of each tie bar.

A rigid block is thus obtained, consisting of substantially parallel sheets 11 arranged at a distance from one another, and wherein holes or channels 12 of each sheet are the continuation of the holes of the next sheet.

Preferably, as shown in FIGS. 4 and 5, at least one face of at least one sheet 11 is to be provided with a support means 16 forming a stiffening means for the sheet on which it rests and a line for the gaseous effluent flowing through said sheet.

Preferably, this support means is arranged downstream from each sheet 11 in relation to the direction of flow of the gaseous effluent shown by the arrows in these figures, and it is arranged opposite and preferably in contact with the back face of the sheet, the front face being the face which faces the gaseous effluent.

This support means consists of a thin rigid plate made of an impermeable material 16 such as a cardboard, metal or plastic plate, having the same surface area as the sheets and through which are pierced holes and orifices corresponding to the holes or channels 2 and orifices 12 of the sheets.

Preferably, the diameter of the holes of plate 16 is slightly larger than the diameter of the holes provided on sheets 11.

Thanks to the presence of this plate, the gaseous effluents cannot flow through all of the sheet and they are forced to flow through channels 2.

Figure 6:
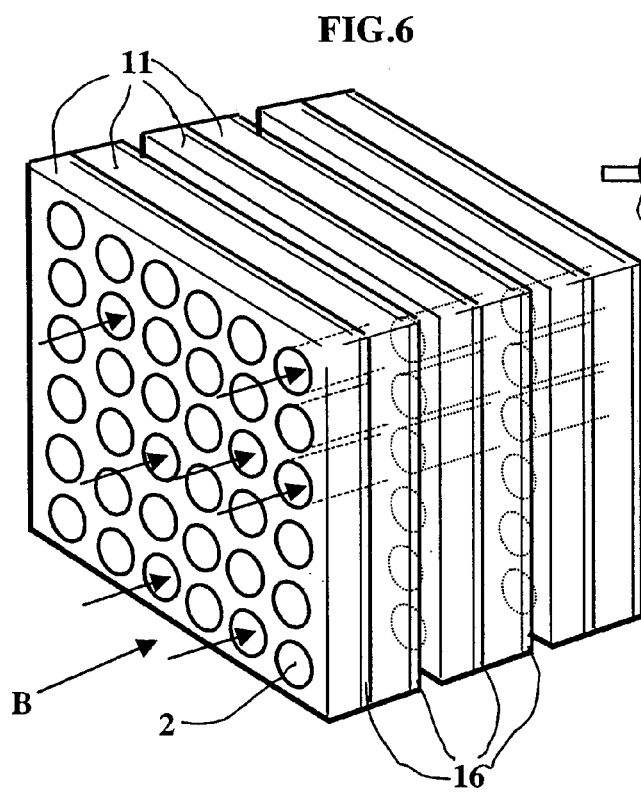
FIG. 6 is a perspective view showing another variant of the invention.

Of course, without departing from the scope of the invention, it is also possible to separate by means of free spaces subassemblies of at least one sheet so as to obtain a series of at least two subassemblies of sheets with a fixed or variable number of sheets, as shown in FIG. 6 with a succession of subassemblies of two sheets, each subassembly being separated by spaces.

In this layout, all or part of the subassemblies of sheets can be provided on their downstream face with a plate 16 as described above.

In a series of tests relative to the variant corresponding to FIG. 5, which is applied to remove particles present in the exhaust gas of a Diesel engine, ceramic batting sheets with extremely fine fibers, such as those marketed under the trade name Kaowool® S, are used. Each sheet is 6-mm thick and is supported by a perforated metal plate that is about 3 mm thick and preferably riveted to the batting sheet. The holes or channels provided in the sheet, which correspond to those of the metal plate, are about 5 mm in diameter and arranged in a triangular configuration so that the distance between each center and the holes is about 8 mm. Each sheet is separated from the neighbouring sheet by a distance ranging between 10 mm and 50 mm, preferably of about 12 mm.

To carry out these tests, ten 300-mm diameter sheets comprising 1200 5-mm diameter holes or channels were arranged in a cylindrical case and it has been observed that almost all of the particles had been removed for exhaust gases having a velocity ranging between 30 m/s and 100 m/s.

In order to free the sheets from the particles they contain and to prevent their saturation, these sheets are to be regenerated by oxidation.

Advantageously, a lattice is arranged on the front face of the sheet, and it is connected to the sheet and to the plate by riveting as described above. This lattice, associated with the plate, has the advantage of reinforcing the resistance of the batting sheet to stresses due to the velocity of the gas and/or to vibrations.

In another experimental run relative to the variant illustrated in FIG. 6, the separator consists of a multiplicity of polypropylene sheets which are 11 cm by 25 cm in dimensions and 1.5 mm in thickness, with about 20-μm diameter fibers permanently charged with static electricity. Each sheet is provided with 6-mm diameter holes or channels and it is separated from the others by a distance that is approximately 3 to 10 times the diameter of the holes and, in the case of this test, the distance is 20 mm, preferably with a triangular layout so as to obtain about 181 holes or channels.

The back face of each sheet, i.e. the opposite side in relation to the gaseous effluent, is provided with a 0.75-mm thick perforated aluminium plate on which the sheet is advantageously stuck, for example by gluing, and whose holes correspond to those of the sheet.

Preferably, each edge of the metal plate is folded up by about 90° in an opposite direction to that of the sheet so as to form a rigid frame serving as bracing means for two neighbouring sheets in order to separate them by a distance of preferably about 22 mm.

For this test, the separator comprises a module consisting of a pile of 19 sheet blocks charged with static electricity and containing each 2 piled sheets of equal size and hole arrangement, each block being separated from the other by a 22-mm space, the holes of each sheet being carefully arranged in line. This module is housed in a case open at both ends, whose outlet end is connected to a suction unit whereas the inlet end communicates with the gaseous effluent that is sucked through the channels by the suction unit.

It is possible to have only one plate on the back face of the last sheet, in relation to the direction of flow of the gaseous effluent.

During this test, the gaseous effluent has a rate of flow of about 70 m$^3$/h, with a pressure drop of 0.25 kPa, and the particle recovery ratio is of the order of 82%.

Of course, several sheet block modules arranged one after the other can be housed in the same case so as to form a device intended to separate the particles contained in a gaseous effluent.

In the case of FIGS. 5 and 6, the gaseous effluent is in turbulent form upstream from each sheet or each block of sheets. More particularly, the gaseous effluent flowing out of a sheet or block of sheets ends in the turbulent state in the space between two sheets or blocks of sheets. Because of these turbulences, the ultrafine particles hit, as a result of the turbulent deposition mechanism, the front surface of the sheet surrounding the holes or channels and they are collected by the fibers of this sheet with the help of the electrostatic forces.

Figure 1:
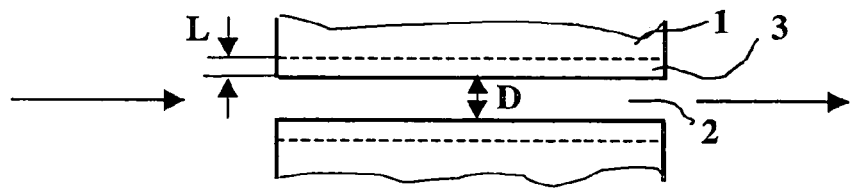
FIG. 1 is a large-scale cross-sectional view of a channel of a separator.

In addition, particles can also be collected by the stratum of the holes formed in the sheets or the blocks of sheets as described in particular in connection with FIGS. 1 and 2.

It can be observed that, by using a distant-sheet separator, a quite significant material gain is obtained in relation to a block consisting of piled sheets as shown in FIG. 4.

By way of example, in order to obtain the same particle recovery with the same pressure drop and the same velocity of flow of the gaseous effluent as in the embodiment of FIG. 5, it would be necessary to use a block consisting of about 500 piled sheets.

Thus, the embodiment of FIG. 5 allows to obtain a material saving higher than 90% in relation to that of FIG. 4.

The present invention is not limited to the examples described above and it includes any variant.

The channels may notably consist of an assembly of batting sheets forming a grid pattern through which the effluents to be treated flow.

The invention claimed is:

1. A separator made of a porous material, intended to treat gaseous effluents containing particles whose size is substantially less than one micrometer or of the order of one micrometer, and comprising channels, wherein the channels are delimited by a fibrous porous material in form of at least one sheet comprising the channels extending therethrough, wherein the at least one sheet is supported by a plate made of an impermeable material having the same surface area as the at least one sheet and provided with holes corresponding to the channels of the at least one sheet.

2. A separator as claimed in claim 1, wherein the porosity of said material ranges between 90% and 99%.

3. A separator as claimed in claim 1, wherein the size of the pores forming said material ranges between about 0.1 mm and about 5 mm.

4. A separator as claimed in claim 1, wherein the diameter of the fibers forming said material ranges between 2 µm and 100 µm.

5. A separator as claimed in claim 1, wherein the diameter of channels running through said material ranges between 3 and 15 mm.

6. A separator as claimed in claim 1, wherein the length of channels ranges between about 10 cm and about 200 cm.

7. A separator as claimed in claim 1, wherein the effluents flow in the turbulent state from one end of channels to the other end.

8. A separator as claimed in claim 1, wherein the material of the fibers is a synthetic material.

9. A separator as claimed in claim 1, wherein the material of the fibers is a ceramic material.

10. A separator as claimed in claim 1, wherein the thickness of sheet ranges between 1 and 10 mm.

11. A separator according to claim 1, wherein the fibrous porous material is made by piling up a plurality of sheets.

12. A separator as claimed in claim 11, wherein the sheets are arranged at a distance from one another by bracing means.

13. A separator as claimed in claim 1, wherein the porous material is charged with static electricity.

14. A separator as claimed in claim 1, wherein the fibrous porous material comprises batting.

15. A separator according to claim 1, wherein the channels extend in a flow direction of the gaseous effluents.

16. A separator made of a porous material, intended to treat gaseous effluents containing particles whose size is substantially less than one micrometer or of the order of one micrometer, and comprising channels, wherein the separator comprises at least one module having at least one sheet made of a fibrous porous material, comprising channels therethrough and arranged substantially parallel and at a distance from at least one other sheet, comprising channels therethrough and at least one made of an impermeable material having the same surface area as each sheet and provided with holes corresponding to channels of sheets.

17. A separator as claimed in claim 16, wherein the porosity of said material ranges between 90% and 99%, the size of the pores ranges between about 0.1 mm and about 5 mm, and the diameter of channels ranges between 3 and 15 mm.

18. A separator as claimed in claim 16, wherein the effluents flow in the turbulent state over at least one face of sheet.

19. A separator as claimed in claim 1, wherein the module comprises at least two subassemblies of at least two sheets arranged at a distance from one another.

20. A separator as claimed in claim 16, wherein the sheets are arranged at a distance from one another by bracing means.

21. A separator as claimed in claim 20, wherein the bracing means consist of a frame.

22. A separator as claimed in claim 21, wherein the frame is obtained from the plated.

* * * * *